United States Patent
Kuba et al.

(10) Patent No.: US 7,294,670 B2
(45) Date of Patent: *Nov. 13, 2007

(54) AQUEOUS POLYURETHANE RESIN DISPERSION AND AQUEOUS ADHESIVE

(75) Inventors: Kazuo Kuba, Osaka (JP); Mitsuru Kitada, Osaka (JP)

(73) Assignee: Dainippon Ink and Chemicals, Inc., Tokyo (JP)

(*) Notice: Subject to any disclaimer, the term of this patent is extended or adjusted under 35 U.S.C. 154(b) by 30 days.

This patent is subject to a terminal disclaimer.

(21) Appl. No.: 10/247,620

(22) Filed: Sep. 20, 2002

(65) Prior Publication Data

US 2004/0014880 A1 Jan. 22, 2004

(30) Foreign Application Priority Data

Jul. 19, 2002 (JP) ............................ 2002-210942

(51) Int. Cl.
C08G 18/08 (2006.01)
C08G 18/12 (2006.01)
C08G 18/46 (2006.01)
C08G 18/66 (2006.01)

(52) U.S. Cl. ...................... 524/589; 524/589; 524/591; 524/839; 524/840; 428/423.1

(58) Field of Classification Search ................ 524/591, 524/839, 840, 589; 428/423.1
See application file for complete search history.

(56) References Cited

U.S. PATENT DOCUMENTS 4,211,683 A 7/1980 Wenzel et al.
5,432,228 A 7/1995 Hilken et al.
6,875,810 B2 * 4/2005 Kitada et al. ............... 524/591
2002/0004553 A1 1/2002 Temme et al.

FOREIGN PATENT DOCUMENTS

| CA | 928323 | 6/1973 |
|---|---|---|
| GB | 1329565 | 9/1973 |
| GB | 1539002 | 1/1979 |
| JP | 49-36693 | 10/1974 |
| JP | 53-26897 | 3/1978 |
| JP | 11-256130 | 9/1999 |
| WO | WO 96/07540 | 3/1996 |
| WO | WO 97/19121 | 5/1997 |

* cited by examiner

*Primary Examiner*—Kriellion A Sanders
(74) *Attorney, Agent, or Firm*—Edwards Angell Palmer & Dodge LLP

(57) ABSTRACT

An aqueous urethane resin dispersion for bonding can be used in wet lamination and dry lamination and can be reactivated easily at a low temperature of about 50 to 70° C. after drying, and is also superior in coatability, adhesive strength, and heat resistance. The aqueous dispersion of a polyurethane resin is superior in contact adhesiveness immediately after lamination and also has good permeability and good coatability not only on bases having smooth surfaces such as plastics and metals, but also on porous bases such as fibers, papers, and buffed leathers; an aqueous adhesive using the aqueous dispersion; and an article to which it is applied. The aqueous polyurethane resin dispersion has at least one of a sulfonate group and a carboxylate group, wherein an average particle diameter of the polyurethane resin is 0.05 to 0.30 μm and a surface tension of the aqueous dispersion (A) is 40 mN/m or less.

10 Claims, No Drawings

AQUEOUS POLYURETHANE RESIN DISPERSION AND AQUEOUS ADHESIVE

BACKGROUND OF THE INVENTION

1. Field of the Invention

The present invention generally relates to an aqueous polyurethane resin dispersion suitable for use as an aqueous adhesive, and relates to the use thereof as an adhesive.

2. Description of Related Art

When bonding bases such as rubber, leather, metal, glass, plastic such as polyvinyl chloride (PVC), foam, fiber and paper using an aqueous polyurethane-based solution or dispersion, the adhesive strength and heat resistance as well as the coatability of adhesives are generally important.

A base coated with an adhesive of an aqueous dispersion is laminated, for example, by a wet lamination method of applying an adhesive on a base and laminating with contact bonding without removing moisture, or a dry lamination method of drying to remove moisture and laminating in a state where the base has adhesiveness. In a case in which an adhesive is applied on a base, which is smooth and is impermeable, such as metal, plastic, or glass, characteristics such as permeability are not required to produce adhesiveness. However, since a rubber or leather, as the base, subjected to a buffing treatment for the purpose of improving its adhesiveness has unevenness and voids on the surface, the permeability of the adhesive is required. Furthermore, higher adhesive strength is expected of porous bases such as fibers and papers by means of an anchoring effect utilizing the permeability of the adhesive.

In the case in which the adhesive is applied manually using a brush or applied mechanically using a knife coater, good spreadability of the adhesive, excellent leveling properties required to form a coating layer having a uniform thickness, and properties such as permeability required for porous bases such as those of fiber are deemed to be important to stably obtain a high adhesive strength. Furthermore, in the case of contact bonding where an adhesive is applied on two bases and the adhesive surfaces are laminated to each other, good mobility of polymer molecules in the adhesive is deemed to be important.

To generate the adhesiveness by removing moisture, a so-called reactivation step of drying under the conditions of about 50 to 70° C. is required and thus requiring the ability to melt at relatively low temperatures within a short time.

Therefore, there has hitherto been a great need to provide an adhesive which is superior in coatability regardless of the surface condition (smoothness or unevenness), non-porosity (impermeability) or porosity (permeability) of bases of, for example, rubber, plastic, leather, and fiber in the bonding operation, and which also exhibits good permeability on the porous base and is superior in adhesive strength and heat resistance.

As such an adhesive, a process for preparing an aqueous dispersion or solution of polyurethane using a prepolymer containing an ethylene oxide unit as a nonionic hydrophilic moiety in a polyether chain is proposed (Japanese Unexamined Patent Application, First Publication No. Sho 53-26897).

However, the polyurethane resin of the aqueous dispersion has a particle diameter of larger than 0.3 µm and a uniform aqueous dispersion is hardly obtained when the content of the ethylene oxide unit is small, while the viscosity becomes higher and the adhesive strength on the base tends to decrease when the content increases. Since the surface tension is large within the range (content) where sufficient adhesive strength can be obtained, the resulting adhesive did not have excellent leveling, permeability, and adhesiveness sufficient to use in bonding of buffed rubbers, leathers, and fibers having characteristics such as porosity.

U.S. Pat. No. 5,432,228 describes a process for preparing an aqueous solution or dispersion of a polyisocyanate polyadduct having at least one of a carboxylate group and sulfonate group as a hydrophilic group. The adhesive prepared from the dispersion contains the polyurethane resin having a small particle diameter but substantially contains no surfactant and, therefore, there arose problems in that the surface tension is large, similar to those in Japanese Unexamined Patent Application, First Publication No. Sho 53-26897, and in that the spreadability upon coating, and performances such as permeability on the porous base and adhesive strength are not satisfactory.

BRIEF SUMMARY OF THE INVENTION

An object of the present invention is to solve the above problems of the prior art and to provide an aqueous urethane resin dispersion for bonding, which can be used in wet lamination and dry lamination and can be reactivated easily at a low temperature of about 50 to 70° C. after drying (removal of moisture), and is also superior in coatability upon coating, adhesive strength, and heat resistance. Another object of the present invention is to provide an aqueous dispersion of a polyurethane resin, which is superior in contact adhesiveness immediately after lamination, and also has good permeability and good coatability, not only on bases having a smooth surface such as plastics and metals, but also on porous bases such as those of fibers, papers, and buffed leathers; an aqueous adhesive using the aqueous dispersion; and an article to which the dispersion is applied.

The present invention provides an aqueous polyurethane resin dispersion which is an aqueous dispersion (A) of a polyurethane resin having at least one of a sulfonate group and a carboxylate group, wherein an average particle diameter of the polyurethane resin is 0.05 to 0.30 µm and a surface tension of the aqueous dispersion (A) is 40 mN/m or less.

Also the present invention provides an aqueous adhesive comprising the aqueous polyurethane resin dispersion and a bonded article obtained by using the same, particularly shoes.

The present invention overcomes the poor adhesiveness and poor coatability that were problems in conventional aqueous polyurethane resin dispersions. The present invention provides an aqueous polyurethane resin dispersion which is superior in contact adhesiveness immediately after lamination, initial and final adhesive strengths and thermal creep resistance and also has leveling properties, permeability on porous bases and good coatability, and an adhesive using the same. Such an adhesive is suitable for bonding various bases such as those of rubber, leather, metal, glass, plastic such as polyvinyl chloride (PVC), foam, fiber, and paper, and is particularly useful for bonding shoes.

DETAILED DESCRIPTION OF THE INVENTION

A polyurethane resin is commonly prepared by reacting an organic polyisocyanate (i) with a polyol compound (ii) and, for example, there is known a process for preparing a polyurethane resin, comprising optionally reacting an organic polyisocyanate (i) with a polyol compound (ii) to prepare a prepolymer having residual isocyanate groups and reacting the isocyanate groups with an amine compound (iii).

In the case in which the aqueous polyurethane resin dispersion in the present invention is prepared, such a process can be employed as a basic process for synthesis of a resin but is not limited thereto.

The organic polyisocyanate (i), which can be used to prepare the aqueous polyurethane resin dispersion of the present invention, is a compound represented by the general formula $R(NCO)_n$ (provided that R in the formula represents an organic compound containing an arbitrary number of carbons, and $n \geq 2$).

Any known compound can be used as the organic polyisocyanate and typical examples thereof include 1,4-tetramethylene diisocyanate, 1,6-hexamethylene diisocyanate, 1,12-dodecamethylene diisocyanate, cyclohexane-1,3- or 1,4-diisocyanate, 1-isocyanato-3-isocyanatomethyl-3,5,5-trimethylcyclohexane (also called: isophorone diisocyanate; hereinafter referred to as IPDI), bis-(4-isocyanatocyclohexyl)methane (hereinafter referred to as hydrogenated MDI), 2- or 4-isocyanatocyclohexyl-2'-isocyanatocyclohexylmethane, 1,3- or 1,4-bis-(isocyanatomethyl)-cyclohexane, bis-(4-isocyanato-3-methylcyclohexyl)methane, 1,3- or 1,4-α,α,α'α'-tetramethylxylylene diisocyanate 2,4- or 2,6-diisocyanatotoluene, 2,2'-, 2,4'- or 4,4'-diisocyanatodiphenylmethane (hereinafter referred to as MDI), 1,5-naphthalene diisocyanate, p- or m-phenylene diisocyanate, and xylylene diisocyanate or diphenyl-4,4'-diisocyanate.

Among these compounds, an aromatic diisocyanate is preferably used in view of the mechanical strength. In view of the durability and light resistance, an aliphatic or alicyclic diisocyanate is preferably used. Although mono- and difunctional polyisocyanates are preferably used because a linear polyurethane resin having optimum thermal activity and durability can be obtained, di- and polyfunctional polyisocyanates may be used in combination as long as the adhesiveness is not adversely affected.

The isocyanate content is preferably within a range from 8 to 25% by weight based on the solid content of the final aqueous urethane resin. When the isocyanate content is within the above range, the cohesive force of urethane molecules is within a preferred range and reactivation at low temperatures is satisfactorily conducted and the initial strength is generated without delay.

The polyol compound (ii) used to prepare the aqueous dispersion of the polyurethane resin of the present invention includes, for example, a high-molecular polyol (b) having a hydroxyl value of 10 to 350 mg KOH/g and a low-molecular polyol (c) having a molecular weight of 300 or less. These high-molecular polyol (b) and low-molecular polyol (c) are preferably used in combination. In that case, the weight ratio (b/c) is preferably 99.5/0.5 to 75/25, and more preferably 99.2/0.8 to 85/15.

Although polymerpolyol having a hydroxyl value of 10 to 350 mg KOH/g, which can be used in the present invention, is exclusively polyesterpolyol because the resulting aqueous dispersion has a high adhesive strength, polyetherpolyol and polycarbonatepolyol may be used alone, or a mixture or a copolymer thereof may be used. The amount of the polyesterpolyol is preferably 100 to 30% by weight, and more preferably 100 to 50% by weight, based on the polyol compound (ii).

The hydroxyl value of the high-molecular polyol is 10 to 350 mg KOH/g, and preferably 20 to 200 mg KOH/g, in view of balance of the adhesiveness.

As used herein, the term "hydroxyl value" refers to the number of mg(s) of potassium hydroxide required to neutralize acetic acid linked to an acetylated compound obtained from 1 g of sample oil.

The aliphatic polyesterpolyol is prepared by reacting various conventionally known aliphatic (alicyclic) polyol compounds and/or aromatic polyol compounds with various conventionally known aliphatic (alicyclic) polycarboxylic acids and/or aromatic polycarboxylic acids, or various reactive derivatives thereof in accordance with various conventionally known processes.

Typical examples of the aliphatic (alicyclic) polyol compound include aliphatic diol such as ethylene glycol, propylene glycol, 1,3-propanediol, 1,3-butanediol, 1,4-butanediol, 1,5-pentanediol, 1,6-hexanediol, neopentyl glycol, diethylene glycol, triethylene glycol, tetraethylene glycol, dipropylene glycol, tripropylene glycol, polyethylene glycol, 3-methyl-1,5-pentanediol or 2-butyl-2-ethyl-1,3-propanediol; and alicyclic diol such as 1,4-cyclohexanediol, 1,4-cyclohexanedimethanol or hydrogenated bisphenol A. Examples of the polyfunctional component include glycerin, trimethylolpropane, and polyol such as penterythritol.

Typical examples of the aromatic polyol compound include bisphenol A, hydroquinone, bishydroxyethoxybenzene, and diol such as alkylene oxide adduct thereof.

Typical examples of the aliphatic (alicyclic) polycarboxylic acids include aliphatic dicarboxylic acid such as succinic acid, adipic acid, suberic acid, azelaic acid, sebacic acid, dimer acid, maleic acid or fumaric acid; alicyclic dicarboxylic acid such as 1,4-cyclohexanedicarboxylic acid; and anhydride or ester-forming derivative thereof.

Examples of the aromatic polycarboxylic acids include aromatic dicarboxylic acid such as terephthalic acid, isophthalic acid, phthalic acid, 1,4-naphthalenedicarboxylic acid, 2,5-naphthalenedicarboxylic acid, 2,6-naphthalenedicarboxylic acid, naphthalic acid, biphenyldicarboxylic acid or 1,2-bis(phenoxy)ethane-p,p'-dicarboxylic acid, and anhydride or ester-forming derivative thereof; and aromatic hydroxycarboxylic acid such as p-hydroxybenzoic acid, and ester-forming derivative thereof.

Examples of the polyfunctional component include polycarboxylic acid such as trimellitic acid, pyromellitic acid or cyclohexanetricarboxylic acid, and anhydride or ester-forming derivative thereof.

The above material may be added thereto a cyclic ester such as ε-caprolactone or γ-valerolactone. The cyclic ester is particularly preferably ε-caprolactone because it is versatile and is readily available commercially.

Examples of the polyetherpolyol include polymers obtained by ring-opening polymerization of 3- or 4-membered ring ether compounds such as ethylene oxide, propylene oxide, butylene oxide, styrene oxide, tetrahydrofuran or epichlorohydrin, or mixtures of two or more kinds thereof in the presence of a compound having an active hydrogen atom (reactive hydrogen atom).

Specific examples of the polyetherpolyol include polyethylenepolyol, polypropylenepolyol and polytetramethylenepolyol. Also a polyethermonool blocked partially with a monoalcohol such as methanol or butanol may be used as long as an increase in number-average molecular weight is not adversely affected.

In the present invention, when the polyurethane resin as the main component includes a large number of ethylene oxide units introduced into the polyether chain, problems such as increase in viscosity and poor adhesiveness arise. Therefore, the amount of the units in the resin is preferably controlled to 10% by weight or less.

Typical examples of the polycarbonatepolyol include reaction products of diols such as 1,3-propanediol, 1,4-butanediol, 1,6-hexanediol, diethylene glycol, bisphenol A, polyethylene glycol, polypropylene glycol and polytetramethylene glycol, and dialkyl carbonate such as dimethyl carbonate or cyclic carbonate such as ethylene carbonate.

The low-molecular polyol having a molecular weight of 300 or less, which can be used in the present invention, may be polyols which are the same as the aliphatic (alicyclic) polyol compound and/or aromatic polyol compound described in the preparation of the polyester. To improve the cohesive force and durability of the resulting polyurethane resin, an increase in molecular weight is required and a polyol having a functionality of 2 or more is preferably used. As long as an increase in molecular weight is not adversely affected, a monool such as methanol, ethanol, n-butanol or isopropyl alcohol can be used.

As the amine compound (iii), which can be used in the present invention, a polyamine having a molecular weight of 300 or less is used as a chain extender of the polyurethane resin. Such an amine compound must have a molecular weight of 300 or less in order to increase the cohesive force of the resulting polyurethane resin. In the present invention, only a polyamine having two or more functional groups (amino groups) in a molecule is preferably used as the amine compound because the average molecular weight of the polyurethane resin increases, thus making it possible to enhance the durability. The monoamine may be used as long as an increase in molecular weight of the polyurethane resin is not adversely affected.

Typical examples of the polyamine having a molecular weight of 300 or less include diamines such as 1,2-diaminoethane, 1,2- or 1,3-diaminopropane, 1,2-, 1,3- or 1,4-diaminobutane, 1,5-diaminopentane, 1,6-diaminohexane, piperazine, N,N'-bis-(2-aminoethyl)piperazine, 1-amino-3-aminomethyl-3,5,5-trimethyl-cyclohexane(isophoronediamine), bis-(4-aminocyclohexyl)methane, bis-(4-amino-3-butylcyclohexyl)methane, 1,2-, 1,3- or 1,4-diaminocyclohexane, and 1,3-diaminopropane; polyamine such as diethylenetriamine or triethylenetetramine; and hydrazine derivative such as hydrazine or adipic acid dihydrazide. Typical examples of the monoamine include ammonia, methylamine, ethylamine, n-propylamine, n-butylamine, n-hexylamine, n-octylamine and n-dodecylamine.

A compound, which has a molecular weight of 300 or less and has an amino group and a hydroxyl group in a molecule, can be used in combination with the polyamine and polyol described above. Examples of the compound having an amino group and a hydroxyl group in a molecule include amino alcohol such as ethanolamine, N-methyldiethanolamine, propanolamine, N-methyldiisopropanolamine, N-ethyldiethyleneamine, N-ethyldiisopropanolamine, aminoethylethanolamine or diethanolamine.

The use of a polyol having at least one of a carboxylate group and a sulfonate group in the polyol compound (ii) makes it possible to introduce a hydrophilic group into the polyurethane resin. The carboxylate group may be introduced into the polyurethane resin by any conventionally known process and preferred processes include (I) a process of using a pendant carboxylate group-containing polyesterpolyol obtained by using a polyol having a carboxylate group in combination with the polyol and polycarboxylic acids described above in the preparation of the polyester, and (II) a process of using a low-molecular polyol having a molecular weight of 300 or less, as it is, in the urethanization step. Typical examples of the polyol having a carboxylate group include 2,2-dimethylopropionic acid, 2,2-dimethylolbutanoic acid, 2,2-dimethylolbutyric acid and 2,2-dimethylolvaleric acid.

The sulfonate group may be introduced into the polyurethane resin by any conventionally known process, and a sulfonate group-containing polyesterpolyol, which is prepared by using a compound having a sulfonate group in combination with the polyol compound and polycarboxylic acids described above, is preferably used as the polyol compound (ii). When using the sulfonate group-containing polyesterpolyol, the water resistance of the coating film made of the aqueous polyurethane resin dispersion is improved compared with the case of introducing a sulfonate group into the urethane resin using a sulfonic acid base-containing polyamine (chain extender).

Typical examples of the compound having a sulfonate group include metal salts of polyol compounds, for example, metal salts of dicarboxylic acid containing metal ions (e.g. Na, K, Li, and Ca ions) such as 5-sulfoisophthalic acid, sulfoterephthalic acid, 4-sulfophthalic acid or 5[4-sulfophenoxy]isophthalic acid or ester derivatives thereof, metal salt of 5-sulfobis(beta-hydroxyethyl)isophthalate, metal salt of 2-sulfo-1,4-butanediol, and polyols such as alkylene oxide adducts thereof. Also these sulfonate group-containing polyols can be used, as is, as the polyol (ii) of the urethane material.

To introduce the hydrophilic group into the polyurethane resin, in addition to the polyol (ii), sulfonic acid diamine described in Japanese Examined Patent Application, Second Publication No. Sho 49-36693 and Canadian Patent No. 928,323, or a compound having a hydrophilic group such as sodium N-(2-aminoethyl)-2-aminopropionate may be used as the chain extender.

The content of the carboxylate group and/or sulfonate group as the hydrophilic group is closely related to the emulsion dispersion stability and the content of these hydrophilic groups is preferably controlled within a range from 50 to 1000 mmol/kg, and more preferably from 70 to 250 mmol/kg, based on the solid content of the urethane resin. When the content of the hydrophilic group is within the above range, the preferred content of the hydrophilic group makes it possible to obtain stable polyurethane particles.

The aqueous dispersion of the present invention is preferably obtained by using the polyamine having a number-average molecular weight of 300 or less and the polyol having a number-average molecular weight of 300 or less as the chain extender, and is particularly preferably obtained by using them in combination with a polyol which has at least one of a sulfonate group and a carboxylate group and also has a hydroxyl value of 10 to 350 mg KOH/g. Such an aqueous dispersion exhibits a high cohesive force of the polyurethane resin and the initial heat resistance due to an increase in number-average molecular weight is improved.

Typical examples of the organic solvent used to prepare the aqueous dispersion of the polyurethane resin include benzene, toluene, ethyl acetate, acetone, methyl ethyl ketone, diethyl ether, tetrahydrofuran, methyl acetate, chloroform and methylene chloride and these organic solvents can be used alone, or mixed solvents thereof can also be used. Among these organic solvents, acetone and methyl ethyl ketone are used particularly preferably because the residual amount of these solvents in the water dispersion after removal of the solvent can be controlled to less than 1% by weight and these solvents have a high solubility in the polyurethane resin.

The polyurethane resin in the aqueous polyurethane resin dispersion of the present invention has an average particle diameter within a range from 0.05 to 0.30 μm, and preferably from 0.10 to 0.20 μm. When the average particle diameter of the polyurethane resin is within the above range, the spreadability upon coating and the permeability on the porous base are improved and also it becomes possible to increase the concentration of the resulting aqueous polyurethane resin dispersion.

In the present invention, the average particle diameter of the polyurethane resin is calculated based on the area and is expressed according to an area which occupies the total surface area $\Sigma n D n^2$ of entire particles. Provided that n denotes the number of particles and D denotes a diameter assuming that the particles are perfect spheres. According to the standard, when the 90% particle diameter in the particle diameter based on the area is 0.25 μm or less, fine particles having a particle diameter of 0.25 μm or less account for 90% or more of particles and, therefore, the permeability on the base with slight unevenness is improved. Simultaneously, when the surface tension of the aqueous polyurethane resin dispersion is 40 mN/m or less, synergistic effects makes it possible to impart excellent coatability, excellent adhesive strength and excellent heat resistance to various bases regardless of leveling properties of the adhesive upon coating, surface condition of the base (smoothness, unevenness), non-porosity (impermeability) or porosity (permeability).

The aqueous polyurethane resin dispersion of the present invention has a surface tension of 40 mN/m or less, and is preferably 30 to 40 mN/m. When the surface tension of the aqueous polyurethane resin dispersion is 40 mN/m or less, it is possible to obtain an aqueous polyurethane resin dispersion which is superior in contact adhesiveness and is also superior in initial adhesive strength, final adhesive strength and thermal creep resistance, and which has good coatability. However, a surface tension of the aqueous polyurethane resin dispersion of more than 40 mN/m is not preferred because the mobility and diffusibility of particles of the aqueous polyurethane resin dispersion are lowered, thereby causing entanglement of resin particles and poor compatibility.

The surface tension of the aqueous polyurethane resin dispersion of the present invention is closely related to the component of polyurethane and can be controlled by selection of the kind of the surfactant or the amount of the surfactant.

The surfactant, which can be used in the present invention, generally refers to one which is used as cleaners, emulsifiers, dispersants, penetrants, solubilizers or frothing agents and can markedly reduce the surface tension or interfacial tension of the solvent in the state of a dilute solution.

The surfactant has a molecular structure such that the molecule has a hydrophobic moiety and a hydrophilic moiety and both moieties maintain moderate balance. The hydrophobic moiety includes a chain hydrocarbon group or a chain hydrocarbon group having a cyclic hydrocarbon group and a fluorinated alkyl group having 4 to 20 carbon atoms, while the hydrophilic moiety includes a nonionic polar group or an ionic polar group such as an anion, cation or betaine.

According to the type of moiety which cause polarity, the surfactant is classified as an anionic surfactant wherein a molecule whose polar moiety is represented by a carboxylic acid group, a sulfuric acid ester group or an allylsulfonic acid group is anionized in water; a cationic surfactant wherein a molecule whose polar moiety is made of an amine salt or a quaternary ammonium salt is cationized; a nonionic surfactant wherein entire molecule is nonionic, represented by those in which polar moiety is a hydroxyl group, an ether group or an ester group; and an amphoteric surfactant which has both anionic and cationic polar groups in a molecule.

Typical examples of the anionic surfactant include a fatty acid salt such as a potash soap of oleic acid or a potash soap of castor oil; alkyl sulfonic acid ester salt such as sodium lauryl sulfate or ammonium lauryl sulfate; alkyl naphthalenesulfonic acid salt such as sodium alkyl naphthalenesulfonate; alkyl diallyl ether sulfonic acid salt such as sodium alkyl diphenyl ether disulfonate; alkyl phosphoric acid salt such as alkyl phosphoric acid diethanolamine; polyoxyethylene alkyl and alkyl allyl ether sulfuric acid ester salt, such as sodium salt of aromatic sulfonic acid formalin condensate, sodium polyoxyethylene alkyl ether sulfate, ammonium sulfate of polyoxyethylene alkyl ether or sodium polyoxyethylene alkylphenyl ether sulfate; fluorine-based surfactant such as perfluoroalkyl carboxylic acid salt; and carboxylic acid type polymer surfactant.

It is particularly preferred to contain, as the anionic surfactant, at least one of sodium dialkyl sulfosuccinate salt and sodium alkyl benzenesulfonate salt. Since the surface tension can be reduced by adding a small amount of the surfactant, it becomes possible to obtain an aqueous polyurethane resin dispersion having improved adhesiveness and coatability.

Examples of the cationic surfactant include alkylamine salts, such as stearylamine acetate, and quaternary ammonium salts, such as stearyltrimethylammonium chloride.

Examples of the nonionic surfactant include polyoxyethylene alkyl ether such as polyoxyethylene lauryl ether; polyoxyethylene alkyl phenyl ether such as polyoxyethylene octyl phenyl ether or polyoxyethylene nonyl pheny ether; and polyoxyethylenealkylamine such as ethylene oxide adduct of acetylenediol, polyoxyethylene derivative, sorbitan fatty acid ester, polyoxyethylene sorbitan fatty acid ester, fatty acid monoglyceride, polyethylene glycol sorbitan fatty acid ester or polyoxyethylene lauryl amine.

Examples of the amphoteric surfactant include alkyl betaine such as lauryl betaine and amine oxide such as lauryl dimethylamine oxide.

In the present invention, although the process of the addition of the above surfactants is not specifically limited, the surfactant may be added at any time upon synthesis of the aqueous polyurethane resin dispersion or the surfactant may be added after the completion of the reaction.

To obtain a uniform aqueous polyurethane resin dispersion having a surface tension of 40 mN/m or less of the present invention, the surfactant is preferably added upon emulsification of the polyurethane resin. According to the addition of the surfactant, not only is the emulsifiability of the polyurethane resin improved, which leads to formation of fine particles, but also the surfactant is adsorbed on the surface of particles during the formation process of particles, thereby reducing the amount of free surfactant, and thus exerting an effect capable of suppressing foaming as small as possible, which occurs when using the surfactant.

When using the aqueous polyurethane resin dispersion of the present invention as the adhesive, it preferably contains at least one of an anionic surfactant and a nonionic surfactant (B) as the surfactant. When using such a surfactant, it is possible to impart excellent contact adhesiveness and brush coatability, coatability such as leveling properties, thermal creep resistance and adhesiveness having excellent initial adhesive strength and to easily control the surface tension of the resulting aqueous polyurethane resin dispersion to 40 mN/m or less.

The anionic surfactant and/or nonionic surfactants (B) used in the aqueous polyurethane resin dispersion of the present invention is preferably present in an amount within a range from 0.05 to 5.0 parts by weight, and more preferably from 0.1 to 2.0 parts by weight, based on 100 parts by weight of the solid content of the polyurethane resin in the aqueous polyurethane resin dispersion. By using the surfactant (B) in an amount within the above range, excellent adhesiveness and coatability can be obtained and sufficient mobility and diffusibility can be imparted to the polyurethane particles, resulting in a state with good contact adhesiveness and leveling properties, and thus easily controlling the surface tension of the aqueous polyurethane resin dispersion to 40 mN/m or less.

The polyurethane resin in the aqueous polyurethane resin dispersion of the present invention is generally self-diffusible because it contains an aromatic sulfonic acid metal salt therein; however, the aqueous polyurethane resin dispersion having a surface tension of 40 mN/m or less cannot be obtained by using the polyurethane resin alone. When the dispersion contains the surfactant (B) in the amount described above, the objects of the present invention can be achieved. To achieve the objects of the present invention, it is necessary to reduce the amount of the surfactant to be as small as possible and to control the surface tension of the resulting aqueous polyurethane resin dispersion to 40 mN/m or less for the following reason. When the amount of the surfactant increases, the adhesive strength at the adhesive interface is reduced due to migration of the surfactant to the adhesive surface and thus the object of the present invention is hardly achieved.

In the preparation of the aqueous polyurethane resin dispersion of the present invention, conventionally known emulsifiers other than those described above can also be used as long as the resulting aqueous polyurethane resin dispersion has a surface tension within the range defined by the present invention.

To obtain an aqueous polyurethane resin dispersion wherein the average particle diameter of the polyurethane resin of the present invention is 0.05 to 0.30 µm, it is necessary to optimize the amount of the hydrophilic group in the polyurethane resin and to optimize the solvent composition and preparation (emulsification) process in accordance with the resin composition.

The solubility and dispersion effect of the resin upon emulsification can be enhanced by using, as the solvent, a ketone solvent having higher hydrophilicity such as acetone or methyl ethyl ketone (MEK) in place of a hydrophobic solvent such as toluene or benzene. Furthermore, the emulsifiability can be enhanced by adding a water-soluble solvent such as methanol, ethanol, isopropyl alcohol or acetone in water or an aqueous solution containing a surfactant as long as an increase in molecular weight is not adversely affected.

The aqueous polyurethane resin dispersion of the present invention can be prepared by conventionally known processes and is not specifically limited. Typical processes are shown below.

(I) Process for preparing an aqueous polyurethane resin dispersion, which comprises reacting an organic polyisocyanate with a polyol in an organic solvent containing no active hydrogen group in a molecule under the conditions of preferably 30 to 150° C., and preferably 50 to 120° C. at an equivalent ratio of an isocyanate group (hereinafter abbreviated to an NCO group) to a hydroxyl group (hereinafter abbreviated to an OH group), NCO group:OH group, within a range from (3-1):1, and preferably (2-1.1):1 using a one-shot process or a multi-stage process to obtain a prepolymer having the residual NCO group; adding dropwise or portionwise water or an aqueous solution containing at least one surfactant selected from a dialkyl sulfosuccinic acid type metal salt or an organic salt and an alkyl benzenesulfonic acid type metal salt or an organic salt in an amount within a range from 0.05 to 5.0% based on the solid content of the polyurethane resin in the prepolymer after or during neutralization of the prepolymer, thereby emulsifying the prepolymer; and adding an aqueous solution containing an amine compound into the resulting emulsion having a residual NCO group, thereby conducting chain extension.

(II) Process for preparing an aqueous polyurethane resin dispersion, which comprises charging water or an aqueous solution containing at least one surfactant selected from a dialkyl sulfosuccinic acid type metal salt or an organic salt and an alkyl benzenesulfonic acid type metal salt or an organic salt in an amount within a range from 0.05 to 5.0% based on the solid content of the polyurethane resin in the prepolymer at a time after or while neutralizing the prepolymer similarly to the process (I); emulsifying the prepolymer by utilizing a mechanical shear force of a homomixer; and adding an aqueous solution containing an amine compound in the resulting emulsion having the residual NCO group, thereby conducting chain extension.

(III) Process for preparing an aqueous polyurethane resin dispersion, which comprises charging water containing an amine compound used as a chain extender or an aqueous solution containing at least one surfactant selected from a dialkyl sulfosuccinic acid type metal salt or an organic salt and an alkyl benzenesulfonic acid type metal salt or an organic salt in an amount within a range from 0.05 to 5.0% based on the solid content of the polyurethane resin in the prepolymer at a time after or during neutralization of the prepolymer similarly to the process (I), thereby simultaneously conducting emulsification and chain extension steps.

(IV) Process for preparing an aqueous polyurethane resin dispersion, which comprises forming a prepolymer having the residual NCO group similar to the process (I); charging an amine compound into the prepolymer, thereby conducting chain extension to obtain a polyurethane resin solution; adding dropwise or portionwise water or an aqueous solution containing at least one surfactant selected from a dialkyl sulfosuccinic acid type metal salt or an organic salt and an alkyl benzenesulfonic acid type metal salt or an organic salt in an amount within a range from 0.05 to 5.0% based on the solid content of the polyurethane resin in an amount within a range from 40 to 500% based on the weight of the polyurethane resin solution, thereby emulsifying the polyurethane resin solution.

(V) Process for preparing an aqueous polyurethane resin dispersion, which comprises reacting an organic polyisocyanate with a polyol in an organic solvent containing no active hydrogen group in a molecule under the conditions of preferably 30 to 150° C., and preferably 50 to 120° C. at an equivalent ratio of an isocyanate group (hereinafter abbreviated to an NCO group) to a hydroxyl group (hereinafter abbreviated to an OH group), NCO group:OH group, within a range from 1:1 using a one-shot process or a multi-stage process to obtain a high-molecular polyurethane resin; and adding dropwise or portionwise water or an aqueous solution containing at least one surfactant selected from a dialkyl sulfosuccinic acid type metal salt or an organic salt and an alkyl benzenesulfonic acid type metal salt or an organic salt in an amount within a range from 0.05 to 5.0% based on the solid content of the polyurethane resin in the polyurethane resin solution after or during neutralization of the polyurethane resin, thereby emulsifying the polyurethane resin.

In the case of the prepolymer reaction of the processes (I) to (IV), the carboxylate group and/or sulfonate group in the molecule are neutralized by using a solution prepared by adding ammonia, organic amine or metal hydroxide in a prepolymer, or water, or an aqueous solution containing a surfactant upon emulsification. An aqueous polyurethane resin dispersion having a stable dispersibility can be obtained by neutralizing with ammonia, an organic amine or a metal hydroxide at a neutralization rate within a range from 50 to 300%, and preferably from 90 to 200%, relative to the anion group. The molecular weight can be increased by conducting the chain extension step using an amine compound at an equivalent ratio of the resulting NCO group of the prepolymer to an amine group (hereinafter abbreviated to an NH group), NCO group:NH group, within a range from 1:(0.5-1.2), and preferably from 1:(0.5-1.0), and thus improving the durability.

In the case of the process (V), the carboxylate group and/or sulfonate group in the molecule are neutralized by a process of adding ammonia, an organic amine or a metal hydroxide in the reaction solution, thereby neutralizing the solution, and adding water or an aqueous solution containing a surfactant by several portions, thereby emulsifying the solution. An aqueous polyurethane resin dispersion containing no organic solvent can be obtained by removing the organic solvent remaining in emulsions obtained in these processes (I) to (V).

It becomes possible to obtain fine particles having a particle diameter of 0.05 to 0.30 μm, and also an aqueous polyurethane resin dispersion having a sharp particle size distribution can be obtained by optimizing the solvent composition, kind, amount of timing of addition of the surfactant, and selection of the process for preparation of the aqueous polyurethane resin dispersion. Furthermore, the surfactant adsorbed on the surface of particles upon emulsification has an advantage in that more stable permeability can be obtained as compared with the case in which it was post-added to the aqueous polyurethane resin dispersion.

In the preparation of the aqueous dispersion of the polyurethane resin, urethanizing catalysts can be used, if necessary. Typical examples of the urethanizing catalyst include various nitrogen-containing compounds such as triethylamine, triethylenediamine and N-methylmorpholine; various metal salts such as potassium acetate, zinc stearate and tin octylate; and various organometallic compounds such as dibutyltin dilaurate.

The aqueous polyurethane resin dispersion of the present invention can be used alone, and there can also be used crosslinking agents which can be used in conventionally known aqueous dispersions. Typical examples thereof include di- and polyfunctional compounds such as amino resin, epoxy compound, aziridine compound, carbodiimide compound, oxazoline compound and polyisocyanate compound. Among these compounds, a polyisocyanate compound is preferably used in an amount within a range from 0.1 to 50% by weight based on the solid content of the polyurethane resin.

Typical examples thereof include a polyisocyanate compound made of a trimer, such as 1,4-tetramethylene diisocyanate, 1,6-hexamethylene diisocyanate, 4,4'-diisocyanatodiphenylmethane (MDI), xylylene diisocyanate or isophorone diisocyanate; and a compound containing plural isocyanate group terminals in a molecule obtained by reacting the polyisocyanate compound with a low-molecular active hydrogen compound such as ethylene glycol, 1,3-butylene glycol, 1,4-butylene glycol, polyoxyethylene glycol or long-chain higher alcohol, or a water dispersion thereof.

The aqueous polyurethane resin dispersion of the present invention can be used in adhesives, pressure-sensitive adhesives, coatings, and treating agents for fibers and papers. Among these, the aqueous polyurethane resin dispersion is suited to bond bases, for example, fibers, plastics such as PVC, leathers, rubbers, foams, lumbers, metals and glasses, and is particularly suited for use as adhesives used for purposes such as textiles, building materials, vacuum formings, automobiles and packing materials, including shoes.

The aqueous adhesive containing the aqueous polyurethane resin dispersion of the present invention may contain the aqueous polyurethane resin dispersion alone, but may contain the other resin, in addition to the polyurethane resin. The other resin is an aqueous resin dispersion of a SBR latex resin or an acrylic emulsion and can be used in an amount within a range from 1 to 100% by weight, and preferably from 50 to 100% by weight, based on the solid content of the polyurethane resin.

The aqueous adhesive of the present invention can contain secondary materials and additives which can be used in conventional adhesives as long as the cohesiveness is not adversely affected. Examples of these secondary materials and additives include plasticizers, tackifiers (for example, rosin resin, rosin ester resin, terpene resin, terpene phenol resin, petroleum resin and cumarone resin), fillers, pigments, thickeners, antioxidants, ultraviolet absorbers, surfactants and flame retardants.

The aqueous adhesive containing the aqueous dispersion of the polyurethane resin of the present invention exhibits a long tack-free time and is capable of bonding at a reactivation temperature of 50 to 70° C. after being applied on a base. Moreover, it is superior in contact adhesiveness immediately after lamination and is also superior in initial adhesive strength, final adhesive strength and thermal creep resistance and, furthermore, it gives good coatability.

When using the aqueous adhesive containing the aqueous dispersion of the polyurethane resin of the present invention in shoes, bases, for example, rubber such as butadiene or SBR, PVC leather and foamed EVA are used. These bases are commonly bonded by using a so-called contact bonding process of applying an aqueous adhesive on each surface to be laminated using a brush, drying the aqueous adhesive at 50 to 60° C., and bringing together the coated surfaces which have become tacky. For easy coating operation, the viscosity of the aqueous adhesive is previously controlled to about 5000 to 10000 mPa·s by mixing with a thickener and a crosslinking is used in combination to attain performances such as high durability.

As a result of the use in combination with the surfactant, the aqueous adhesive containing the aqueous dispersion of the polyurethane resin of the present invention resin exhibits good leveling properties of the liquid level of the adhesive and spreadability upon coating, and also exhibits excellent permeability on a porous base. Furthermore, since the adhesives are compatibilized and integrated when contacted, high adhesiveness and an improvement in productivity can be realized in bonding process lines of shoes.

EXAMPLES

The following Examples and Comparative Examples further illustrate the present invention in detail; however, the present invention is not limited to these Examples. In the following Examples and Comparative Examples, parts and percentages are by weight unless otherwise specified.

The procedure for evaluation of adhesive performances of the aqueous polyurethane resin dispersion of the present invention is as follows. The results are shown in Tables 1 to 3. With respect to the formulations in the respective tables, units denote parts.

Procedure for Measurement of Particle Diameter

Using a laser diffraction/scattering type particle size distribution measuring apparatus (LA-910, HORIBA, Ltd.) and water as a dispersion, an average particle diameter and a 90% particle diameter (undersize) of an aqueous polyurethane resin dispersion were measured at a relative refractive index of 1.10 when the particle size is calculated based on the area. As used herein, "90% particle diameter" is a value at or below which particle diameters of 90% of entire particles are distributed.

Procedure for Measurement of Surface Tension

In a glass dish having an inner diameter of 50 mm, 20 ml of an aqueous polyurethane resin dispersion maintained at 20° C. of the present invention was charged and the surface tension was measured by Wilhelmy's method using an autobalance type electric surface tension meter, Model ESB-IV (manufactured by Kyowa Interface Science Co., LTD.). In the measurement, a platinum plate was used.

Procedure for Evaluation of Tack-free Time

An adhesive of an aqueous polyurethane resin dispersion was applied on a SBR rubber sheet having a size of 3 mm (thickness)×20 mm (width)×300 mm (length) with a coating weight of 100 g/m² using a brush, and then reactivated in a hot-air circulating dryer at 60° C. for 4 minutes. Time was measured at which the applied surfaces are no longer bonded together even if the surfaces to be bonded are laminated by pressing using a rubber roller because tack of the adhesive on the surface of the base removed from the dryer is lost, and this was taken to be the tack-free time.

Procedure for Evaluation of Contact Adhesiveness

After a SBR sheet coated with an adhesive of an aqueous polyurethane resin dispersion and a buffed natural leather having an uneven surface were laminated, the bonded surface was manually peeled off after one minute and the state of cohesive breakage of the adhesive was observed. Then, the contact adhesiveness was evaluated by the persistence of the adhesive. The evaluation in Table 3 was conducted according to the following criteria.

⊚: considerably strong peeling resistance, adhesives on both surfaces of the base are stretched upon peeling ○: strong peeling resistance, adhesives on both surfaces of the base are stretched upon peeling Δ: weak peeling resistance, adhesives on both surfaces of the base are not stretched upon peeling X: no peeling resistance, easily peeled Procedure for Evaluation of Leveling Properties After an adhesive of an aqueous polyurethane resin dispersion was applied on a SBR sheet and a buffed natural leather using a brush, the uniform coatability of the liquid level of the adhesive was visually evaluated.

⊚: adhesive layer is formed on the surface of a base in a uniform thickness

○: adhesive layer is formed on the surface of a base in nearly uniform thickness X: uneven adhesive layer is formed on the surface of a base Procedure for Evaluation of Permeability After an aqueous adhesive was applied on a buffed natural leather having a fibrous surface with a coating weight of 100 g/m² using a brush, the penetration rate of the adhesive was visually observed.

⊚: good penetration of the adhesive

○: satisfactory penetration of the adhesive

Δ: adhesive barely penetrated and most of the adhesive remained on the base surface Procedure for Evaluation of Brush Coatability After an adhesive of an aqueous polyurethane resin dispersion was applied on a SBR sheet and a buffed natural leather using a brush, the spreadability of the adhesive was visually evaluated.

⊚: adhesive uniformly applied on entire surface of base

○: adhesive nearly uniformly applied on nearly entire surface of base

Δ: portion coated with no adhesive present in a portion of the surface of base

Procedure for Evaluation of Initial Adhesive Strength

In the same manner as in the case of the measurement of the tack-free time, an aqueous adhesive was applied on a SBR sheet and a buffed natural leather with a coating weight of 100 g/m². The coated SBR sheet and buffed natural leather were reactivated in a hot-air circulating dryer at 60° C. for 4 minutes. The surfaces to be bonded of two bases removed from the dryer were laminated by pressing using a rubber roller, and then the peeling strength was measured by a digital gage after two minutes had passed since the completion of the lamination.

Procedure for Evaluation of Peeling Strength with Lapse of Time

With respect to laminated specimens made in the same manner as in the case of the procedure for evaluation of the initial adhesive strength, the peeling strength was measured by a tensile tester after 2 hours and 1 day had passed since the completion of the lamination. 180 degree peeling strength was measured at a testing speed of 100 mm/min.

Procedure for Evaluation of Thermal Creep Resistance

Each of laminated specimens made in the same manner as in the case of the procedure for evaluation of the initial adhesive strength was cured with aging at room temperature for 3 days. After applying a weight of 1 kg to the specimen, the sample was subjected to a 180 degree creep test in a hot-air circulating dryer at 70° C. for 30 minutes. The peeling distance (mm) among a distance between marked lines (100 mm) or the weight drop time was measured.

REFERENCE EXAMPLE

Preparation Example of Polyesterpolyol (1) Having an Aromatic Sulfonic Acid Metal Salt Group In a reaction vessel equipped with a thermometer, a nitrogen introducing tube and a stirrer, 1480 parts of dimethyl 5-sulfosodiumisophthalate (DMS), 1240 parts of 1,6-hexanediol and 0.5 parts of dibutyltin oxide were charged while introducing a nitrogen gas and the transesterification reaction was conducted at the reaction vessel inner temperature of 180 to 190° C. so that the column top temperature becomes 60 to 70° C. until the acid value becomes 1 mg KOH/g or less, and then the reaction was conducted at 210° C. for 2 hours. After cooling to 100° C., 2280 parts of ε-caprolactone was charged and the ring-opening polymerization reaction was conducted at 180° C. for 3 hours to obtain a polyesterpolyol (1) having a hydroxyl value of 120 mg KOH/g and an acid value of 0.3 mg KOH/g. The results are show in Table 1.

TABLE 1

|  | Polyesterpolyol (1) |
| --- | --- |
| Charge unit (mol) | |
| DMS (B-1) | 5 |
| 1,6-hexanediol (B-2) | 10.5 |
| ε-caprolactone (B-3) | 20 |
| Hydroxyl value (mg KOH/g) | 120 |
| Acid value (mg KOH/g) | 0.3 |
| Theoretic sulfonic acid metal base content (mmol/kg) | 1080 |

Example 1

50 Parts of the polyesterpolyol (1) was added to 60 parts of methyl ethyl ketone (abbreviated to MEK) and, after dissolving with sufficient stirring, 44 parts of isophorone diisocyanate (abbreviated to IPDI) was added and the mixture was reacted at 80° C. for 3 hours. After charging 110 parts of MEK and cooling to 60° C., 2 parts of neopentyl glycol and 160 parts of butylene adipate (hydroxyl value=56 mg KOH/g) as a polyester of 1,4-butylene glycol and adipic acid was added and the prepolymer reaction was conducted at 80° C. After the isocyanate value reached 0.89% or less, the resulting prepolymer was cooled to 40° C. and an aqueous solution prepared previously by uniformly dissolving 3.6 parts of NEOCOL YSK (sodium dialkyl sulfosuccinate ester salt, active component: 70%, manufactured by Dai-ichi Kogyo Seiyaku Co., Ltd.) in 300 parts of water was added dropwise in the prepolymer while stirring. Immediately after the completion of the dropwise addition, 35 parts of 10% aqueous piperazine solution (90 equivalent % of an amine group relative to the residual isocyanate group) was added, thereby emulsifying the prepolymer. The solvent was removed from the resulting emulsion to obtain a water dispersion having a nonvolatile content of 50%.

After thickening the resulting water dispersion by adding 1 part of SN-Thickner A-812 (Sannopko) to 100 parts of the water dispersion, 5 parts of a water-dispersible isocyanate crosslinking agent CR-60N (manufactured by DAINIPPON INK & CHEMICALS, Inc.) was added to prepare an adhesive.

After the adhesive thus prepared was applied on an SBR sheet and a natural leather with a coating weight of 100 g/m² using a brush, the surfaces to be bonded were laminated, and adhesion properties were evaluated. The adhesive of the present invention exhibited a uniform thickness after brush coating and the laminated base was superior in adhesive strength, thermal creep resistance, and coatability.

Example 2

40 Parts of the polyesterpolyol (1) was added to 60 parts of MEK and, after dissolving with sufficient stirring, 44 parts of IPDI was added and the mixture was reacted at 80° C. for 3 hours. After charging 105 parts of MEK and cooling to 60° C., 3 parts of neopentyl glycol and 160 parts of butylene adipate (hydroxyl value=56 mg KOH/g) as a polyester of 1,4-butylene glycol and adipic acid was added and the prepolymer reaction was conducted at 80° C. After the isocyanate value reached 0.94% or less, the resulting prepolymer was cooled to 40° C. and an aqueous solution prepared previously by uniformly dissolving 7.2 parts of NEOCOL YSK (sodium dialkyl sulfosuccinate ester salt, active component: 70%, manufactured by Dai-ichi Kogyo Seiyaku Co,. Ltd.) in 300 parts of water was added dropwise in the prepolymer while stirring. Immediately after the completion of the dropwise addition, 36 parts of 10% aqueous piperazine solution (90 equivalent % of an amine group relative to the residual isocyanate group) was added, thereby emulsifying the prepolymer. The solvent was removed from the resulting emulsion to obtain a water dispersion having a nonvolatile content of 50%.

After thickening the resulting water dispersion by adding 1 part of SN-Thickner A-812 (Sannopko) to 100 parts of the water dispersion, 5 parts of a water-dispersible isocyanate crosslinking agent CR-60N (manufactured by DAINIPPON INK & CHEMICALS, Inc.) was added to prepare an adhesive.

After the adhesive thus prepared was applied on an SBR sheet and a natural leather with a coating weight of 100 g/m² using a brush, the surfaces to be bonded were laminated, and adhesion properties were evaluated. The adhesive of the present invention exhibited a uniform thickness after brush coating and the laminated base was superior in adhesive strength, thermal creep resistance, and coatability.

Example 3

142 parts of MEK was added in 160 parts of butylene adipate (hydroxyl value=56 mg KOH/g) as a polyester of 1,4-butylene glycol and adipic acid, 2 parts of neopentyl glycol and 7 parts of 2,2-dimetyhylolpropionic acid and, after charging 44 parts of IPDI, the reaction was conducted at 75° C. After the isocyanate value reached 1.10% or less, the resulting reaction solution was cooled to 40° C. and 5.3 parts of triethylamine was charged therein, thereby neutralizing the reaction solution. In the reaction solution, an aqueous solution prepared previously by uniformly dissolving 3.0 parts of NEOCOL YSK (sodium dialkyl sulfosuccinate ester salt, active component: 70%, manufactured by Dai-ichi Kogyo Seiyaku Co,. Ltd.) in 400 parts of water was added at a time and, after sufficiently mixing with stirring, 36 parts of 10% aqueous piperazine solution (90 equivalent % of an amine group relative to the residual isocyanate group) was added, thereby emulsifying the reaction solution. The solvent was removed from the resulting emulsion to obtain a water dispersion having a nonvolatile content of 40%.

After thickening the resulting water dispersion by adding 1 part of SN-Thickner A-812 (Sannopko) to 100 parts of the water dispersion, 5 parts of a water-dispersible isocyanate crosslinking agent CR-60N (manufactured by DAINIPPON INK & CHEMICALS, Inc.) was added to prepare an adhesive.

After the adhesive thus prepared was applied on an SBR sheet and a natural leather with a coating weight of 100 g/m² using a brush, the surfaces to be bonded were laminated, and adhesion properties were evaluated. The adhesive of the present invention exhibited a uniform thickness after brush coating and the laminated base was superior in adhesive strength, thermal creep resistance, and coatability.

Comparative Example 1

30 Parts of the polyesterpolyol (1) was added to 60 parts of MEK and, after dissolving with sufficient stirring, 40 parts of IPDI was added and the mixture was reacted at 80° C. for 3 hours. After charging 110 parts of MEK and cooling to 60° C., 2 parts of neopentyl glycol and 160 parts of butylene adipate (hydroxyl value=56 mg KOH/g) as a polyester of 1,4-butylene glycol and adipic acid was added and the prepolymer reaction was conducted at 80° C. After the isocyanate value reached 1.02% or less, the resulting reaction solution was cooled to 40° C. and an aqueous solution prepared previously by uniformly dissolving 3.6 parts of NEOCOL YSK in 300 parts of water was added at a time and, after sufficiently mixing with stirring, 38 parts of 10% aqueous piperazine solution (90 equivalent % of an amine group relative to the residual isocyanate group) was added, thereby emulsifying the reaction solution. The solvent was removed from the resulting emulsion to obtain a water dispersion having a nonvolatile content of 50%.

The resulting aqueous dispersion had a large particle diameter. In the same manner as in Example 1, an adhesive was prepared using the aqueous dispersion, and then the surfaces to be bonded were laminated, and adhesion properties were evaluated. As a result, the coatability and initial adhesive strength were not insufficient.

Comparative Example 2

In the same manner as in Example 1, except that NEOCOL YSK was not added, synthesis was conducted to obtain a water dispersion having a nonvolatile content of 50%. In the same manner as in Example 1, an adhesive was prepared using the resulting aqueous dispersion, and then the surfaces to be bonded were laminated, and adhesion properties were evaluated. As a result, the coatability and initial adhesive strength were not insufficient.

TABLE 2

Examples and Comparative Examples

|  | Example 1 | Example 2 | Example 3 | Comparative Example 1 | Comparative Example 2 |
|---|---|---|---|---|---|
| Polyisocyanate: IPDI | 44 | 44 | 44 | 40 | 44 |
| Polyol: |  |  |  |  |  |
| Polyesterpolyol (1) | 50 | 40 |  | 30 | 50 |
| Butylene adipate (hydroxyl value (OHV) = 56) | 160 | 160 | 160 | 160 | 160 |
| Neopentyl glycol | 2 | 3 | 2 | 2 | 2 |
| 2,2-dimethylolpropionic acid |  |  | 7 |  |  |
| Solvent: MEK | 170 | 165 | 142 | 170 | 170 |
| Neutralizer: triethylamine |  |  | 5.3 |  |  |
| Amine compound: aqueous 10% piperazine solution | 35 | 36 | 36 | 38 | 35 |
| Water | 300 | 300 | 400 | 300 | 300 |
| Solid content of polyurethane | 259.5 | 250.6 | 216.6 | 235.8 | 259.5 |
| Surfactant: NEOCOL YSK (70%) | 3.6 | 7.2 | 3.0 | 3.6 | 0.0 |
| Additive amount of surfactant (based on the solid content of polyurethane) | 1.0% | 2.0% | 1.0% | 1.0% | 0.0% |
| Addition of surfactant | upon emulsification | upon emulsification | upon emulsification | upon emulsification | not added |
| Sulfonic acid metal salt group content (mmol/kg) | 208 | 172 |  | 137 | 208 |
| Carboxylate group content (mmol/kg) |  |  | 241 |  |  |
| Average particle diameter (μm) | 0.20 | 0.25 | 0.10 | 0.55 | 0.28 |
| Standard deviation (μm) | 0.37 | 0.40 | 0.20 | 0.72 | 0.42 |
| Surface tension (mN/m) | 34 | 33 | 34 | 35 | 47 |

TABLE 3

Examples and Comparative Examples

|  | Example 1 | Example 2 | Example 3 | Comparative Example 1 | Comparative Example 2 |
|---|---|---|---|---|---|
| ADHESIVENESS |  |  |  |  |  |
| Tack-free time | ≧3 min | ≧3 min | ≧3 min | ≧3 min | ≧3 min |
| Contact adhesiveness | ⊙ | ⊙ | ⊙ | Δ | Δ |
| Leveling properties | ⊙ | ⊙ | ⊙ | ○ | X |
| Permeability | ⊙ | ⊙ | ⊙ | ○ | Δ |
| Brush coatability (spreadability) | ⊙ | ⊙ | ⊙ | ○ | Δ |
| Initial adhesive strength (N/20 mm) | 50 | 50 | 52 | 45 | 38 |
| Adhesive strength over time |  |  |  |  |  |
| After 2 hours (N/20 mm) | 72 | 69 | 70 | 63 | 51 |
| After 1 day (N/20 mm) | 95 | 90 | 92 | 81 | 69 |
| Thermal creep resistance (mm) | 2 | 8 | 5 | 42 | dropped for 15 min |

What is claimed is:

1. An aqueous polyurethane resin dispersion comprising:
   a polyurethane resin having at least one of a sulfonate group and a carboxylate group, wherein an average particle diameter of the polyurethane resin is 0.05 to 0.30 μm; and
   at least one anionic surfactant selected from the group consisting of dialkyl sulfosuccinic acid metal salts, dialkyl sulfosuccinic acid organic salts, alkyl benzenesulfonic acid metal salts and alkyl benzenesulfonic acid organic salts,
   wherein said aqueous polyurethane resin dispersion is obtained from an organic polyisocyanate (a), a polyol (b) which has at least one of a sulfonate group and a carboxylate group and also has a hydroxyl value of 10 to 350 mg KOH/g, and at least one of a polyamine having a molecular weight of 300 or less and a polyol having a molecular weight of 300 or less (c), wherein a surface tension of said aqueous polyurethane resin dispersion is 40 mN/m or less, and
   wherein said polyol (b) is obtained from:
   (1) a compound having a sulfonate group selected from the group consisting of metal salts of dicarboxylic acids, or ester derivatives thereof, containing a sulfonate group, metal salts of 2-sulfo-1,4-butanediol, and alkylene oxide adducts of metal salts of 2-sulfo-1,4-butanediol;
   (2) at least one of an aliphatic polyol compound and an aromatic polyol compound; and
   (3) a cyclic ester selected from the group consisting of ε-caprolactone and γ-valerolactone.

2. The aqueous polyurethane resin dispersion according to claim 1, wherein the polyol (b) is a polyesterpolyol including a polyesterpolyol having a sulfonate group and the component (c) comprises a polyamine having a molecular weight of 300 or less and a polyol having a molecular weight of 300 or less.

3. The aqueous polyurethane resin dispersion according to claim 1, which contains the polyol (b) in the amount of 55 to 85% by weight based on the solid content of the polyurethane resin.

4. The aqueous polyurethane resin dispersion according to claim 1, which has the sulfonate group in the amount of 70 to 250 mmol/kg based on the solid content of the polyurethane resin in the aqueous polyurethane resin dispersion.

5. An aqueous adhesive comprising an aqueous dispersion of the polyurethane resin of claim 1.

6. A bonded article obtained by using the aqueous adhesive of claim 5.

7. Shoes obtained by using the aqueous adhesive of claim 5.

8. The aqueous polyurethane resin dispersion according to claim 1, wherein said polyol (b) is obtained from:
  (1) a compound having a sulfonate group selected from the group consisting of metal salts of dicarboxylic acids, and ester derivatives thereof, having a sulfonate group;
  (2) at least one of an aliphatic polyol compound and an aromatic polyol compound; and
  (3) a cyclic ester selected from the group consisting of ε-caprolactone and γ-valerolactone.

9. The aqueous polyurethane resin dispersion according to claim 1, wherein said polyol (b) is obtained from:
  a metal salt of 5-sulfoisophthalic acid or ester derivative thereof, 1,6-hexanediol; and ε-caprolactone.

10. The aqueous polyurethane resin dispersion according to claim 8, wherein said dicarboxylic acids or ester derivatives thereof are selected from the group consisting of 5-sulfoisophthalic acid, sulfoterephthalic acid, 4-sulfophthalic acid and 5[4-sulfophenoxy]isophthalic acid and 5-sulfobis(beta-hydroxyethyl)isophthalate.

* * * * *